(12) United States Patent
Xiong et al.

(10) Patent No.: US 11,059,173 B2
(45) Date of Patent: Jul. 13, 2021

(54) ROBOT JOINT MOTION CONTROL METHOD, DEVICE AND ROBOT USING THE SAME

(71) Applicant: UBTECH Robotics Corp, Shenzhen (CN)

(72) Inventors: Youjun Xiong, Shenzhen (CN); Jianxin Pang, Shenzhen (CN); Lifu Zhang, Shenzhen (CN); Wenhua Fan, Shenzhen (CN); Dong Liu, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 344 days.

(21) Appl. No.: 16/236,518

(22) Filed: Dec. 30, 2018

(65) Prior Publication Data

US 2020/0206922 A1 Jul. 2, 2020

(51) Int. Cl.
*B25J 9/16* (2006.01)

(52) U.S. Cl.
CPC .......... *B25J 9/1664* (2013.01); *B25J 9/1653* (2013.01)

(58) Field of Classification Search
CPC ...... B25J 9/1656; B25J 9/1664; B25J 9/1653; G05B 2219/40519; G05B 2219/40512; G05B 2219/39298
See application file for complete search history.

(56) References Cited

U.S. PATENT DOCUMENTS

| | | | | |
|---|---|---|---|---|
| 10,912,558 B2* | 2/2021 | Harris | ................ | A61B 17/282 |
| 10,913,152 B2* | 2/2021 | Rozo | ................ | B25J 9/163 |
| 10,917,514 B1* | 2/2021 | Chen | ................ | H04M 1/72457 |
| 2013/0317646 A1* | 11/2013 | Kimoto | ................ | G05B 19/425 |
| | | | | 700/250 |
| 2019/0240833 A1* | 8/2019 | Kimura | ................ | B25J 9/0081 |

FOREIGN PATENT DOCUMENTS

CN 108568817 A 9/2018

* cited by examiner

*Primary Examiner* — Robert T Nguyen (57) ABSTRACT

The present disclosure provides a robot joint motion control method and apparatus as well as a robot using the same. The method includes: obtaining coordinates of a plurality of key points of a motion of a joint of the robot based on a preset linear control model; determining coordinates of two smooth connecting points respectively before and after each key point based on a preset time connecting factor; calculating a joint motion trajectory between each two adjacent smooth connecting points using a preset parabola connecting formula, based on the coordinates of the two smooth connecting points and the corresponding key point; and controlling the joint of the robot to move according to the joint motion trajectory between each two adjacent smooth connecting points. The present disclosure can avoid the joints of a robot from overshooting, thereby enhancing the user experience.

15 Claims, 8 Drawing Sheets

ROBOT JOINT MOTION CONTROL METHOD, DEVICE AND ROBOT USING THE SAME

BACKGROUND

1. Technical Field

The present disclosure relates to intelligent robot technology, and particularly to a robot joint motion control method and apparatus as well as a robot using the same.

2. Description of Related Art

With the continuous development of artificial intelligence technology, the researches of intelligent robots have gradually involved the applications in people's daily life. In which, consumer or entertainment robots have gradually employed in home, entertainment and service industry. Since the types of robots have lower cost, the motions of their joints are generally simple.

At present, the control of the motion of the joints in consumer robots or entertainment robots often uses disconnecting or simple linear connecting control. These two control methods are relatively simple to implement, while the joints of a robot in movement are prone to overshoot, and even cause other issues such as the stiffness and mechanization in their action or the shake of the entire robot, which affect the user experience.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

Figure 1:
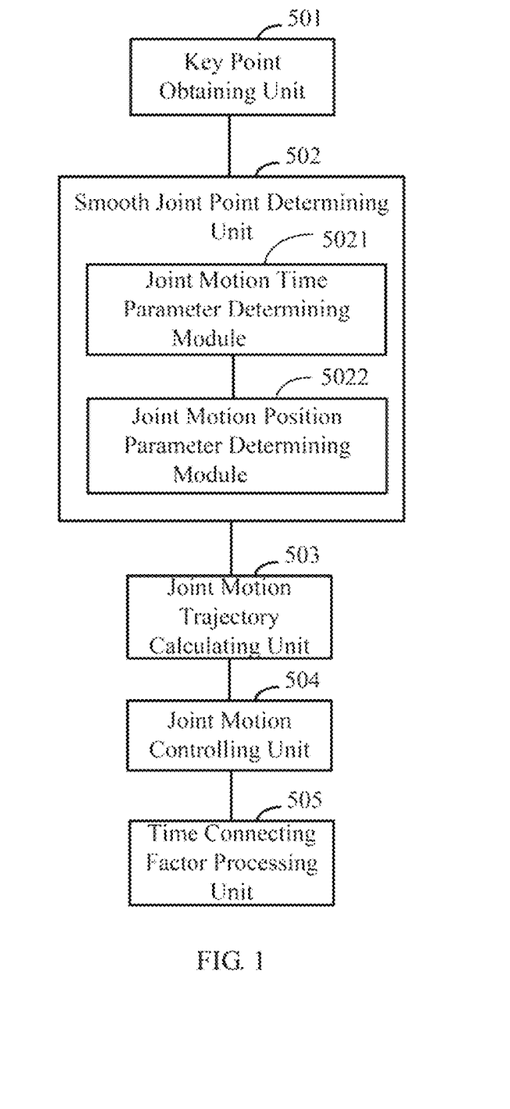
FIG. 1 is a schematic block diagram of a robot joint motion control apparatus according to an embodiment of the present disclosure.

FIG. 1 is a schematic block diagram of a robot joint motion control apparatus according to an embodiment of the present disclosure, which corresponds to the robot joint motion control method of the above-mentioned embodiment. For the convenience of description, only parts related to this embodiment are shown. The apparatus can be applied to a robot having joint(s) for realizing the movement of a limb of the robot which connected to the joint(s), where each joint includes servo(s) driven by a motor, and the movement of the limb is realized by the motor of each servo to rotate an output shall of the servo which is connected to the limb. As shown in FIG. 1, a robot joint motion control apparatus includes: a key point obtaining unit 501, a smooth joint point determining unit 502, a joint motion trajectory calculating unit 503, and a joint motion controlling unit 504.

The key point obtaining unit 501 is configured to obtain coordinates of a plurality of key points of a motion of a joint of the robot based on a preset linear control model, where the plurality of key points are points in a coordinate system at which the joint to switch between each two single actions; and the horizontal coordinate of the key points is a time parameter of the motion of the joint, and the vertical coordinate of the key points is a position parameter of the motion of the joint.

The smooth joint point determining unit 502 is configured to determine coordinates of two smooth connecting points respectively before and after each key point based on a preset time connecting factor.

The joint motion trajectory calculating unit 503 is configured to calculate a joint motion trajectory between each two adjacent smooth connecting points using a preset parabola connecting formula, based on the coordinates of the two smooth connecting points and the corresponding key point.

The joint motion controlling unit 504 is configured to control the joint of the robot to move according to the joint motion trajectory between each two adjacent smooth connecting points.

It can be known from this embodiment that, after obtaining coordinates of a plurality of key points of a motion of a joint of the robot based on a preset linear control model; determining coordinates of two smooth connecting points respectively before and after each key point based on a preset time connecting factor; calculating a joint motion trajectory between each two adjacent smooth connecting points using a preset parabola connecting formula, based on the coordinates of the two smooth connecting points and the corresponding key point; and controlling the joint of the robot to move according to the joint motion trajectory between each two adjacent smooth connecting points, when the joint of the robot in this embodiment moves, it is controlled to move through the smooth connecting point firstly according to the preset linear control model, so that the cost of control is low, while the control of the motion of the joint of consumer robots or entertainment robots can be achieved. At the same time, the joint of the robot is controlled to move according to the joint motion trajectory between two adjacent smooth connecting points when the joint is between the two adjacent smooth connecting points, so as to realize the smooth connection when the motion of the joint of the robot is changed. As a result, the joints of a robot are avoided from overshooting, and even other issues such as the stiffness and mechanization in their action or the shake of the entire robot are avoided, thereby enhancing the user experience.

Referring to FIG. 1, in one embodiment, the preset linear control model is:

$$y = y_1 + (y_2 - y_1)\frac{x - x_1}{x_2 - x_1} \quad (1)$$

where, y the position parameter of the motion of the joint; x is the time parameter of the motion of the joint $x_1$ is the starting time of the single action; $y_1$ is the starting position of the single action; $x_2$ is the ending time of the single action; $y_2$ is the ending position of the single action.

Referring to FIG. 1, in one embodiment, the smooth connecting point before each key point is a first smooth connecting point corresponding to the key point, and the smooth connecting point after each key point is a second smooth connecting point corresponding to the key point. The smooth joint point determining unit 502 includes:

a joint motion time parameter determining module 5021 configured to subtract the preset time connecting factor from the time parameter of the motion of the joint of each key point to obtain the time parameter of the motion of the joint of the first smooth connecting point corresponding to the key point, and add the preset time connecting factor and the time parameter of the motion of the joint of each key point to obtain the time parameter of the motion of the joint of the seconds smooth connecting point corresponding to the key point; and a joint motion position parameter determining module 5022 configured to import the time parameter of the motion of the joint of the first smooth connecting point into a preset linear control model to obtain the position parameter of the motion of the joint of the first smooth connecting point corresponding to the key point, and importing the time parameter of the motion of the joint of the second smooth connecting point into the preset linear control model to obtain the position parameter of the motion of the joint of the second smooth connecting point corresponding to the key point.

Referring to FIG. 1, in one embodiment, the joint motion trajectory smoothing calculating unit 503 is configured to calculate the joint motion trajectory between each two adjacent smooth connecting points based on the preset parabola connecting formula of:

$$y_p = (1-t)^2 y_{p0} + 2(1-t)t y_{p1} + t^2 y_{p2}, \text{ where } t = \frac{x - x_{p0}}{x_{p2} - x_{p0}};$$

where, t is the time parameter of the motion of the joint of the joint motion trajectory of two smooth connecting points, $y_p$ is the position parameter of the motion of the joint of the joint motion trajectory of two smooth connecting points, $(x_{p0}, y_{p0})$ and $(x_{p2}, y_{p2})$ are the coordinates of two adjacent smooth connecting points, $(x_{p1}, y_{p1})$ is the coordinate of the corresponding key point.

Referring to FIG. 1, in one embodiment, the apparatus further includes:

a time connecting factor processing unit 505 configured to obtain a time interval between any target key point and a key point adjacent to the target key point, and adjust the preset time connecting factor such that the adjusted time connecting factor is less than or equal to the time interval, if the preset time connecting factor is larger than the time interval.

The apparatus may include a processor, a memory, and a computer program stored in the memory and executable on the processor. In which, the computer program includes the above-mentioned modules/units in the apparatus. It should be noted that, each of the above-mentioned modules/units may be implemented in the form of hardware (e.g., a circuit), software (e.g., a program), or a combination thereof (e.g., a circuit with a single chip microcomputer).

Figure 2:
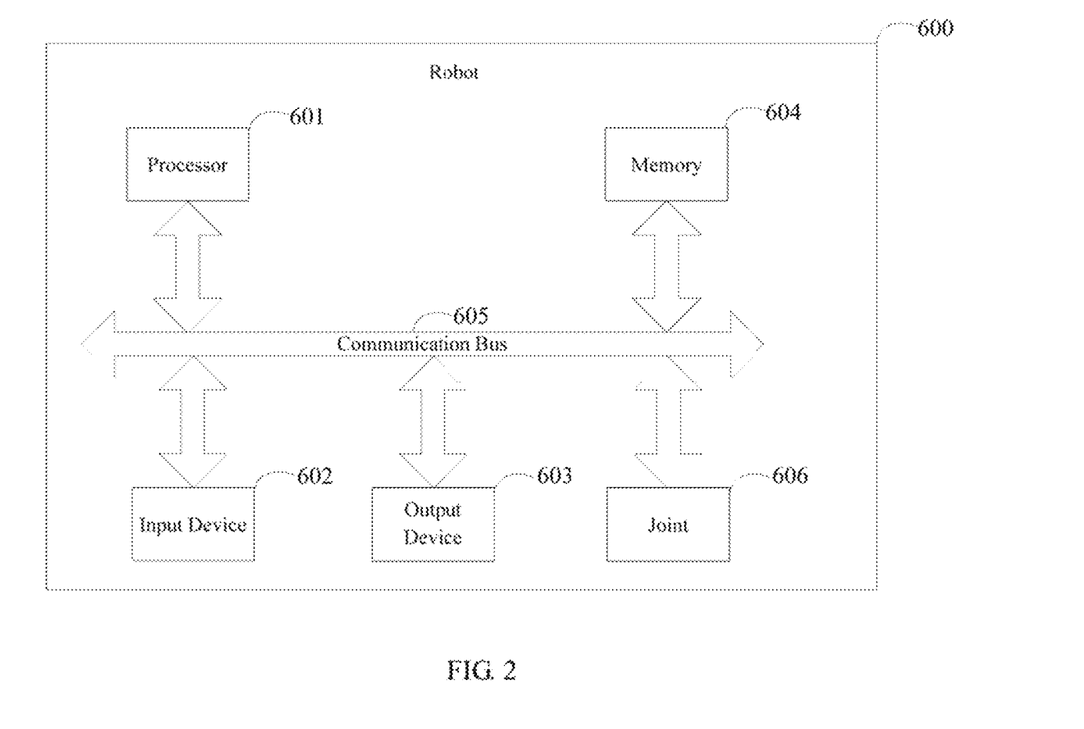
FIG. 2 is a schematic block diagram of a robot according to an embodiment of the present disclosure.

FIG. 2 is a schematic block diagram of a robot according to an embodiment of the present disclosure. As shown in FIG. 2, in this embodiment, a robot 600 may include one or more processors 601, one or more input devices 602, one or more output devices 603, and one or more memories 604, a communication bus 605, and one or more joints 606. The processor 601, the input device 602, the output device 603, the memory 604, and the joints 606 communicate with each other via the communication bus 605. The memory 604 is configured to store computer programs including instructions. The processor 601 is configured to execute instructions stored by the memory 604. In which, the processor 601 may be configured to call the instructions to execute the steps in each of the method embodiments, for example, steps S101-S104 shown in FIG. 3; alternatively, the processor 601 may be configured to call the instructions to perform the functions of each module/unit in each of the device embodiments, for example, the functions of the modules 501-505 shown in FIG. 1.

The robot can realize the movement of a limb of the robot which connected to the joint 606, where each joint 606 includes servo(s) driven by a motor, and the movement of the limb is realized by the motor of each servo to rotate an output shaft of the servo which is connected to the limb.

It should be comprehended that, in this embodiment, the processor 601 may be a central processing unit (CPU), or the other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The input device 602 may include a touch panel, a fingerprint sensor (for collecting fingerprint information of the user and direction information of the fingerprint), a microphone, and the like, and the output device 603 may include a display (LCD or the like), a speaker, and the like.

The memory 604 can include read only memory and random access memory and provides instructions and data to the processor 601. A portion of the memory 604 can also include a non-volatile random access memory, for example, the memory 604 can also store information of the device type.

In a specific implementation, in this embodiment, the processor 601, the input device 602, and the output device 603 may perform the implementation manner described in the method provided by this embodiment, and the implementation manner of the robot 600 may also be implemented, which are not described herein again.

Figure 3:
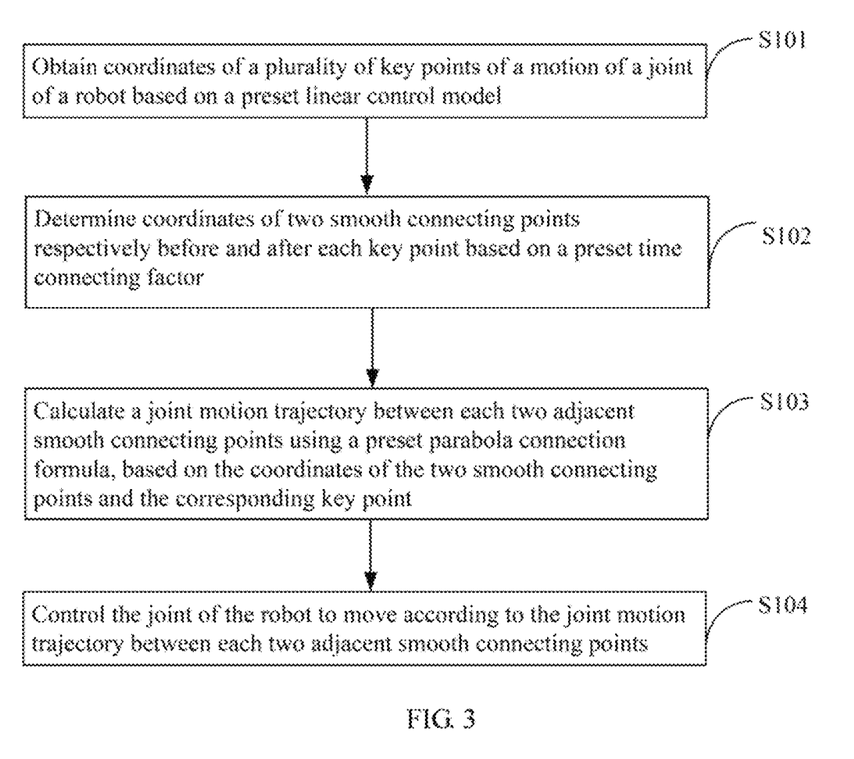
FIG. 3 is a flow chart of an embodiment of a robot joint motion control method according to the present disclosure.

FIG. 3 is a flow chart of an embodiment of a robot joint motion control method according to the present disclosure. In this embodiment, the method is a computer-implemented method executable for a processor, which may be implemented through a robot joint motion control apparatus as shown in FIG. 1 or a robot as shown in FIG. 2. The method can be applied to the robot having joint(s) for realizing the movement of a limb of the robot which connected to the joint(s), where each joint includes servo(s) driven by a motor, and the movement of the limb is realized by the motor of each servo to rotate an output shaft of the servo which is connected to the limb. As shown in FIG. 3, the method includes the following steps.

S101: obtaining coordinates of a plurality of key points of a motion of a joint of the robot based on a preset linear control model, where the plurality of key points are points in a coordinate system at which the joint to switch between each two single actions; and the horizontal coordinate of the key points is a time parameter of the motion of the joint, and the vertical coordinate of the key points is a position parameter of the motion of the joint.

Figure 4:
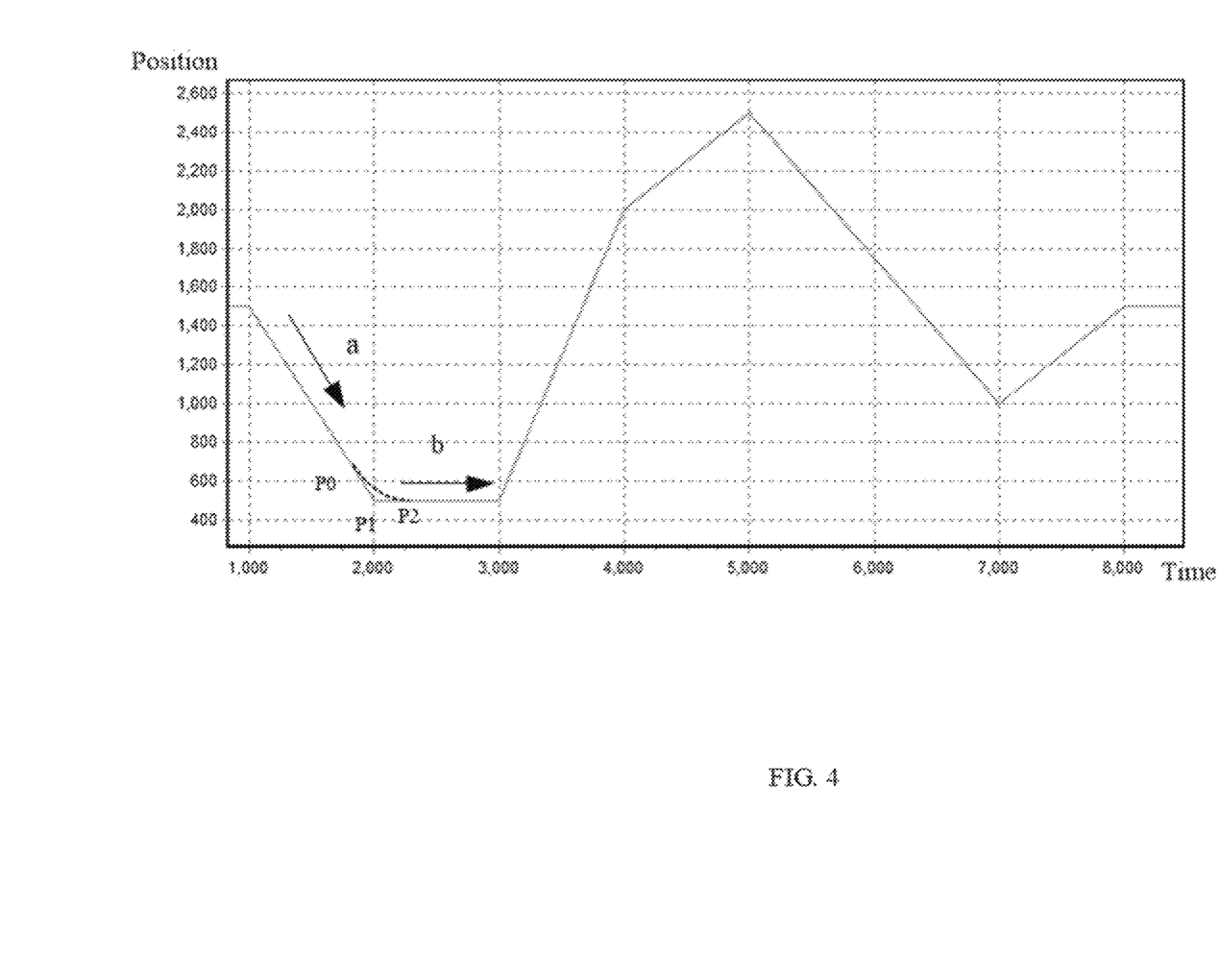
FIG. 4 is a schematic diagram of a motion curve of a joint of a robot obtained through a linear control model according to an embodiment of the present disclosure.

In this embodiment, the simple linear control of the joint of the robot is realized through the preset linear control model. In the single motion, the direction (i.e., the route) of the of motion of the robot does not change. FIG. 4 is a schematic diagram of a motion curve of a joint of a robot obtained through a linear control model according to an embodiment of the present disclosure. As shown in FIG. 4, in one single motion, the joint of the robot is moved in one direction (shown by "a" in the figure), and the direction of the motion of the joint changes at the key point (shown by "P1" in the figure), and then the joint starts to be moved toward the other direction (shown by "b" in the figure). In which, the horizontal coordinate is the time parameter of the motion of the joint, which can be in the unit of mm (millimeter); and the vertical coordinate is the position parameter of the motion of the joint, which can be in the unit of ms (millisecond).

In one embodiment the preset linear control model is:

$$y = y_1 + (y_2 - y_1)\frac{x - x_1}{x_2 - x_1} \quad (1)$$

where, y is the position parameter of the motion of the joint; x is the time parameter of the motion of the joint; $x_1$ is the starting time of the single action; $y_1$ is the starting position of the single action; $x_2$ is the ending time of the single action; $y_2$ is the ending position of the single action.

S102: determining coordinates of two smooth connecting points respectively before and after each key point based on a preset time connecting factor.

In this embodiment, each key point may correspond to one preset time connecting factor, and the preset time connecting factor may be determined according to the distance between each key point and the adjacent key point, where the preset time connecting factor is a time interval. The smooth connecting points are before and after the key point so that the smooth transitive connecting of actions can be achieved whenever switching two single actions.

In one embodiment, one smooth connecting point having a time interval before the time parameter of the key point and another smooth connecting point having a time interval after the time parameter of the key point can be obtained, where the smooth connecting point is a point on the preset linear control model.

S103: calculating a joint motion trajectory between each two adjacent smooth connecting points using a preset parabola connecting formula, based on the coordinates of the two smooth connecting points and the corresponding key point.

In this embodiment, all the time parameters between two adjacent smooth connecting points can be imported into the preset parabola connecting formula, so as to calculate the positional parameters of the motion of the joint corresponding to each time parameter between the two adjacent smooth connecting points, thereby obtaining the joint motion trajectory between the two adjacent smooth connecting points.

In one embodiment, calculating the joint motion trajectory between each two adjacent smooth connecting points based on the preset parabola connecting formula of:

$$y_p = (1-t)^2 y_{p0} + 2(1-t)t y_{p1} + t^2 y_{p2}, \text{ where } t = \frac{x - x_{p0}}{x_{p2} - x_{p0}} \quad (2)$$

where, t is the time parameter of the motion of the joint of two smooth connecting points, $y_p$ is the position parameter of the motion of the joint of two smooth connecting points, $(x_{p0}, y_{p0})$ and $(x_{p2}, y_{p2})$ are the coordinates of two adjacent smooth connecting points, $(x_{p1}, y_{p1})$ is the coordinate of the corresponding key point.

S104: controlling the joint of the robot to move according to the joint motion trajectory between each two adjacent smooth connecting points.

In this embodiment, referring to FIG. 4, when the joint of the robot is moved, the joint is controlled to move through the smooth connecting point (shown by "P1" in FIG. 4) according to the preset linear control model first, and then the joint of the robot is controlled to move according to the joint motion trajectory (shown by the broken line in FIG. 4) between two adjacent smooth connecting points (shown by "P0" and "P2" in FIG. 4) when the joint is between the two adjacent smooth connecting points. The joint of the robot is controlled to move by driving the output shaft of the servo(s) of the joint to rotate.

It can be known from this embodiment that, after obtaining coordinates of a plurality of key points of a motion of a joint of the robot based on a preset linear control model; determining coordinates of two smooth connecting points respectively before and after each key point based on a preset time connecting factor; calculating a joint motion trajectory between each two adjacent smooth connecting points using a preset parabola connecting formula, based on the coordinates of the two smooth connecting points and the corresponding key point; and controlling the joint of the robot to move according to the joint motion trajectory between each two adjacent smooth connecting points, when the joint of the robot in this embodiment moves, it is controlled to move through the smooth connecting point firstly according to the preset linear control model, so that the cost of control is low, while the control of the motion of the joint of consumer robots or entertainment robots can be achieved. At the same time, the joint of the robot is controlled to move according to the joint motion trajectory between two adjacent smooth connecting points when the joint is between the two adjacent smooth connecting points, so as to realize the smooth connection when the motion of the joint of the robot is changed. As a result, the joints of a robot are avoided from overshooting, and even other issues such as the stiffness and mechanization in their action or the shake of the entire robot are avoided, thereby enhancing the user experience.

Figure 5:
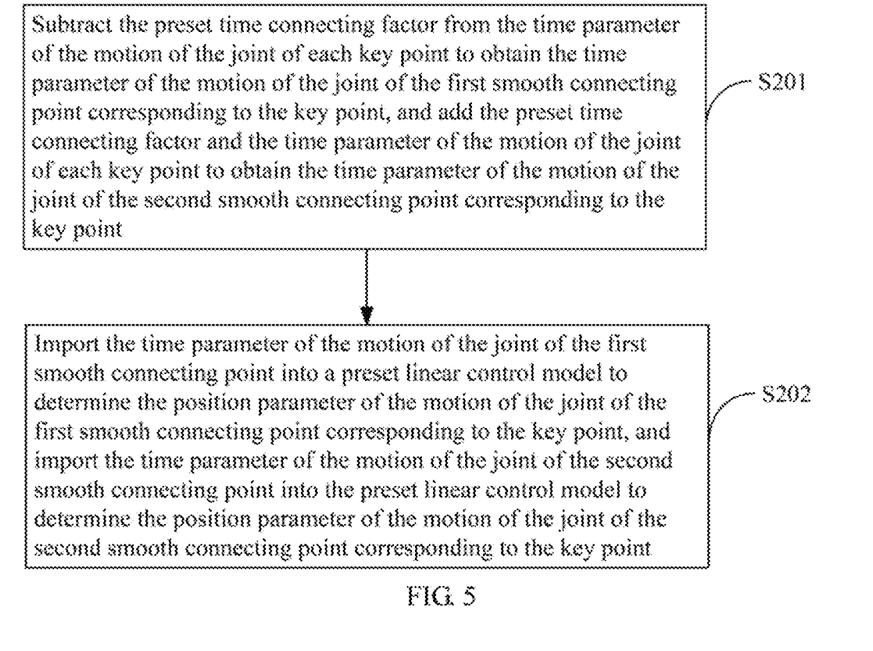
FIG. 5 is a flow chart of another embodiment of a robot joint motion control method according to the present disclosure.

Referring to FIG. 4, the coordinate of each key point is indicated by $P1(x_{p1}, y_{p1})$; the smooth connecting point before the key point in two adjacent smooth connecting points is the first smooth connecting point corresponding to the key point, where the first smooth connecting point is indicated by $P0(x_{p0}, y_{p0})$; and the smooth connecting point after the key point is the second smooth connecting point corresponding to the key point, where the second smooth connecting point is indicated by $P2(x_{p2}, y_{p2})$. FIG. 5 is a flow chart of another embodiment of a robot joint motion control method according to the present disclosure. As shown in FIG. 5, the above-mentioned step S102 includes the following steps.

S201: subtracting the preset time connecting factor from the time parameter of the motion of the joint of each key point to obtain the time parameter of the motion of the joint of the first smooth connecting point corresponding to the key point, and adding the preset time connecting factor and the time parameter of the motion of the joint of each key point to obtain the time parameter of the motion of the joint of the second smooth connecting point corresponding to the key point.

In this embodiment, referring to FIG. 4, the two smooth connecting points before and after the key point are determined based on the preset time connecting factor k and the time parameter $x_{p1}$ of the motion of the joint of the corresponding key point P1, where the time parameter of the motion of the joint of the first smooth connecting point P0 is $x_{p0}=x_{p1}-k$, and the time parameter of the motion of the joint of the second smooth connecting point P2 is $x_{p2}=x_{p1}+k$.

S202: importing the time parameter of the motion of the joint of the first smooth connecting point into a preset linear control model to determine the position parameter of the motion of the joint of the first smooth connecting point corresponding to the key point and importing the time parameter of the motion of the joint of the second smooth connecting point into the preset linear control model to determine the position parameter of the motion of the joint of the second smooth connecting point corresponding to the key point.

In this embodiment, the time parameter $x_{p0}$ of the motion of the joint of the first smooth connecting point P0 is imported into the formula (1) so as to calculate the position parameter $y_{p0}$ of the motion of the joint of the first smooth connecting point P0; and the time parameter $x_{p2}$ of the motion of the joint of the second smooth connecting point P2 is imported into the formula (1) so as to calculate the position parameter $y_{p2}$ of the motion of the joint of the second smooth connecting point P2.

Figure 6:
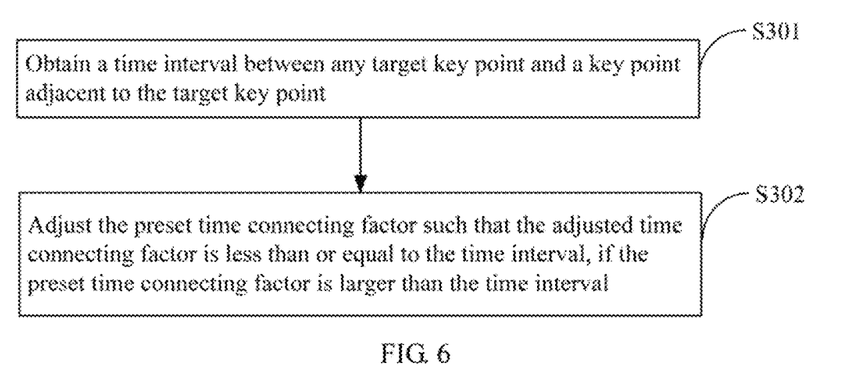
FIG. 6 is a flow chart of the other embodiment of a robot joint motion control method according to the present disclosure.

FIG. 6 is a flow chart of the other embodiment of a robot joint motion control method according to the present disclosure. As shown in FIG. 6, before the above-mentioned step S102, the method further includes the following steps.

S301: obtaining a time interval between any target key point and a key point adjacent to the target key point.

S302: adjusting the preset time connecting factor such that the adjusted time connecting factor is less than or equal to the time interval, if the preset time connecting factor is larger than the time interval.

Figure 7:
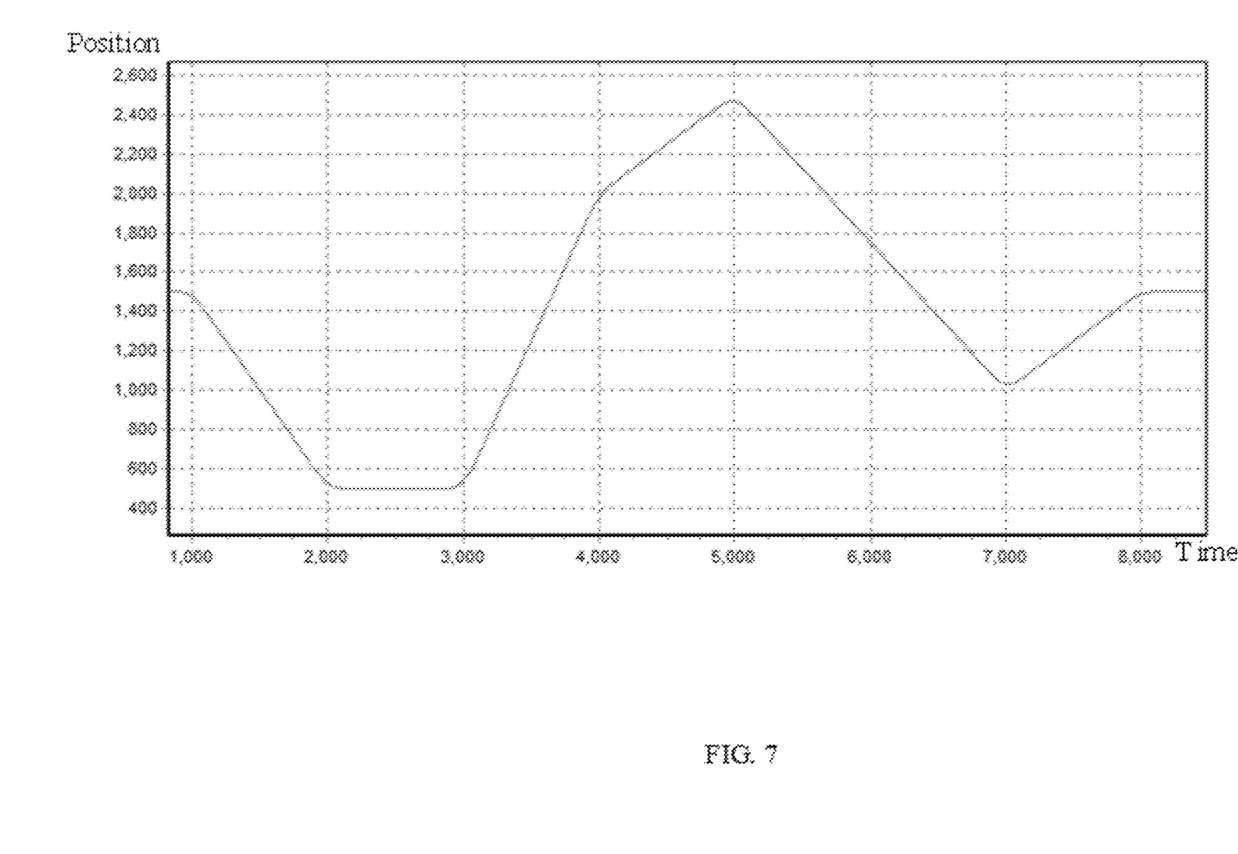
FIG. 7 is a schematic diagram of the motion curve of the joint of the robot corresponding to a time connecting factor of 100 ms according to an embodiment of the present disclosure.
Figure 8:
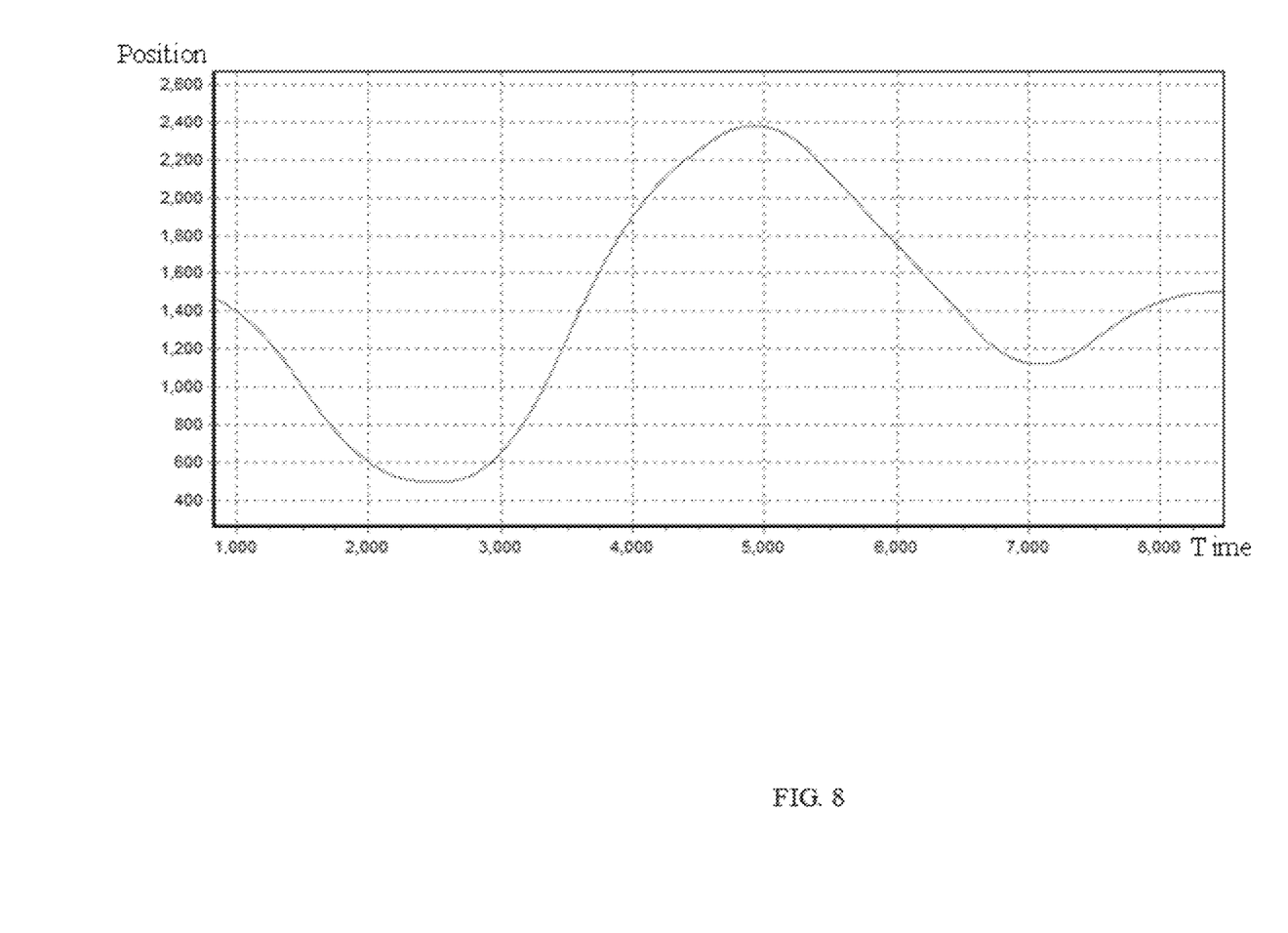
FIG. 8 is a schematic diagram of the motion curve of the joint of the robot corresponding to a time connecting factor of 400 ms according to an embodiment of the present disclosure.

In this embodiment, the motion curves of the joint of the robot corresponding to different time connecting factors are different. FIG. 7 is a schematic diagram of the motion curve of the joint of the robot corresponding to a time connecting factor of 100 ms according to an embodiment of the present disclosure, and FIG. 8 is a schematic diagram of the motion curve of the joint of the robot corresponding to a time connecting factor of 400 ms according to an embodiment of the present disclosure.

In another embodiment of the present disclosure, a non-transitory computer-readable storage medium is provided. The non-transitory computer-readable storage medium stores a computer program including program instructions. All or part of the processes in the method for implementing the above-mentioned embodiments of the present disclosure are implemented when the program instructions are executed by the processor, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The non-transitory computer-readable storage medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the non-transitory computer readable storage medium may be appropriately increased or decreased according to the requirements of legislation and patent practice in the jurisdiction. For example, in some jurisdictions, according to the legislation and patent practice, a non-transitory computer readable storage medium does not include electric carrier signals and telecommunication signals.

The computer-readable storage medium may be an internal storage unit of the robot of any of the above-mentioned embodiment, for example, a hard disk or a memory of the robot. The computer-readable storage medium may also be an external storage device of the robot, for example, a plug-in hard disk, a smart media card (SMC), a secure digital (SD) card, flash card, and the like, which is equipped on the robot. Furthermore, the computer-readable storage medium may further include both an internal storage unit and an external storage device, of the robot. The computer-readable storage medium is configured to store the computer program and other programs and data required by the robot. The computer-readable storage medium may also be used to temporarily store data that has been or will be output.

Those ordinary skilled in the art may clearly understand that, the exemplificative units and steps described in the embodiments disclosed herein may be implemented through electronic hardware, computer software, or a combination of the two. In order to clearly illustrate the interchangeability of hardware and software, the composition and steps of the examples have been generally described in terms of functions in the above-mentioned description. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

Those skilled in the art may clearly understand that, for the convenience and simplicity of description, for the specific operation process of the above-mentioned robot and units, reference may be made to the corresponding processes in the above-mentioned method embodiments, and are not described herein.

In the embodiments provided by the present disclosure, it should be understood that the disclosed robot and method may be implemented in other manners. For example, the above-mentioned apparatus embodiment is merely exemplary. For example, the division of units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, the functional units in each of the embodiments may be integrated in one processing unit, or each unit may exist alone physically, or two or more units may be integrated in one unit. The above-mentioned integrated unit may be implemented in the form of hardware or in the form of software functional unit.

The forgoing is only the specific embodiment of the present disclosure, while the scope of the present disclosure is not limited thereto. For those skilled in the art various equivalent modifications or replacements that can be easily conceived within the technical scope of the present disclosure should be included within the scope of the present disclosure. Therefore, the scope of the present disclosure should be determined in accordance with the scope of the claims.

What is claimed is:

1. A computer-implemented joint motion control method for a robot, comprising executing on a processor the steps of:
    obtaining coordinates of a plurality of key points of a motion of a joint of the robot based on a preset linear control model, wherein the plurality of key points are points in a coordinate system at which the joint switches between two single actions; and the horizontal coordinate of the key points is a time parameter of the motion of the joint, and the vertical coordinate of the key points is a position parameter of the motion of the joint;
    determining coordinates of two smooth connecting points respectively before and after each key point based on a preset time connecting factor;
    calculating a joint motion trajectory between each two adjacent smooth connecting points using a preset parabola connecting formula, based on the coordinates of the two smooth connecting points and the corresponding key point; and
    controlling the joint of the robot to move according to the joint motion trajectory between each two adjacent smooth connecting points.

2. The method of claim 1, wherein the preset linear control model is:

$$y = y_1 + (y_2 - y_1)\frac{x - x_1}{x_2 - x_1};$$

where, y is the position parameter of the motion of the joint; x is the time parameter of the motion of the joint; $x_1$ is the starting time, of the single action; $y_1$ is the starting position of the single action: $x_2$ is the ending time of the single action; $y_2$ is the ending position of the single action.

3. The method of claim 1, wherein the smooth connecting point before each key point is a first smooth connecting point corresponding to the key point, and the smooth connecting point after each key point is a second smooth connecting point corresponding to the key point; the step of determining the coordinates of the two smooth connecting points respectively before and after each key point based on the preset time connecting factor comprises:
    subtracting the preset time connecting factor from the time parameter of the motion of the joint of each key point to obtain the time parameter of the motion of the joint of the first smooth connecting point corresponding to the key point, and adding the preset time connecting factor and the time parameter of the motion of the joint of each key point to obtain the time parameter of the motion of the joint of the second smooth connecting point corresponding to the key point; and
    importing the time parameter of the motion of the joint of the first smooth connecting point into a preset linear control model to obtain the position parameter of the motion of the joint of the first smooth connecting point corresponding to the key point, and importing the time parameter of the motion of the joint of the second smooth connecting point into the preset linear control model to obtain the position parameter of the motion of the joint of the second smooth connecting point corresponding to the key point.

4. The method of claim 1, wherein the step of calculating the joint motion trajectory between each two adjacent smooth connecting points using the preset parabola connecting formula, based on the coordinates of the two smooth connecting points and the corresponding key point comprises:
    calculating the joint motion trajectory between each two adjacent smooth connecting points based on the preset parabola connecting formula of:

$$y_p = (1-t)^2 y_{p0} + 2(1-t)t y_{p1} + t^2 y_{p2}, \text{ where } t = \frac{x - x_{p0}}{x_{p2} - x_{p0}};$$

where, t the time parameter of the motion of the joint of the joint motion trajectory of two smooth connecting points, $y_p$ is the position parameter of the motion of the joint of the joint motion trajectory of two smooth connecting points, $(x_{p0}, y_{p0})$ and $(x_{p2}, y_{p2})$ are the coordinates of two adjacent smooth connecting points, $(x_{p1}, y_{p1})$ is the coordinate of the corresponding key point.

5. The method of claim 1, wherein before the step of determining the coordinates of the two smooth connecting points respectively before and after each key point based on the preset time connecting factor, the method further comprises:
    obtaining a time interval between any target key point and a key point adjacent to the target key point; and adjusting the preset time connecting factor such that the adjusted time connecting factor is less than or equal to the time interval, in response to the preset time connecting factor being larger than the time interval.

6. A joint motion control apparatus for a robot, comprising:
a processor;
a memory; and
computer program stored in the memory and executable on the processor;
wherein when the computer program is executed by the processor, cause the processor to:
obtain coordinates of a plurality of key points of a motion of a joint of the robot based on a preset linear control model, wherein the plurality of key points are points in a coordinate system at which the joint switches between two single actions; and the horizontal coordinate of the key points is a time parameter of the motion of the joint, and the vertical coordinate of the key points is a position parameter of the motion of the joint;
determine coordinates of two smooth connecting points respectively before and after each key point based on a preset time connecting factor;
calculate a joint motion trajectory between each two adjacent smooth connecting points using a preset parabola connecting formula, based on the coordinates of the two smooth connecting points and the corresponding key point; and
control the joint of the robot to move according to the joint motion trajectory between each two adjacent smooth connecting points.

7. The apparatus of claim 6, wherein the preset linear control model is:

$$y = y_1 + (y_2 - y_1)\frac{x - x_1}{x_2 - x_1};$$

where, y is the position parameter of the motion of the joint; x is the time parameter of the motion of the joint; $x_1$ is the starting time of the single action; $y_1$ is the starting position of the single action; $x_2$ is the ending time of the single action; $y_2$ is the ending position of the single action.

8. The apparatus of claim 7, wherein the smooth connecting point before each key point is a first smooth connecting point corresponding to the key point, and the smooth connecting point after each key point is a second smooth connecting point corresponding to the key point; when the computer program is executed by the processor, further cause the processor to:
subtract the preset time connecting factor from the time parameter of the motion of the joint of each key point to obtain the time parameter of the motion of the joint of the first smooth connecting point corresponding to the key paint, and add the preset time connecting factor and the time parameter of the motion of the joint of each key point to obtain the time parameter of the motion of the joint of the second smooth connecting point corresponding to the key point; and
import the time parameter of the motion of the joint of the first smooth connecting point into a preset linear control model to obtain the position parameter of the motion of the joint of the first smooth connecting point corresponding to the key point, and importing the time parameter of the motion of the joint of the second smooth connecting point into the preset linear control model to obtain the position parameter of the motion of the joint of the second smooth connecting point corresponding to the key point.

9. The apparatus of claim 6, wherein when the computer program is executed by the processor, further cause the processor to: calculate the joint motion trajectory between each two adjacent smooth connecting points based on the preset parabola connecting formula of:

$$y_p = (1-t)^2 y_{p0} + 2(1-t)t y_{p1} + t^2 y_{p2}, \text{ where } t = \frac{x - x_{p0}}{x_{p2} - x_{p0}};$$

where, t is the time parameter of the motion of the joint of the joint motion trajectory of two smooth connecting points, $y_p$ is the position parameter of the motion of the joint of the joint motion trajectory of two smooth connecting points, $(x_{p0}, y_{p0})$ and $(x_{p2}, y_{p2})$ are the coordinates of two adjacent smooth connecting points, $(x_{p1}, y_{p1})$ is the coordinate of the corresponding key point.

10. The apparatus of claim 6, wherein when the computer program is executed by the processor, further cause the processor to:
obtain a time interval between any target key point and a key point adjacent to the target key point, and adjust the preset time connecting factor such that the adjusted time connecting factor is less than or equal to the time interval, in response to the preset time connecting factor being larger than the time interval.

11. A robot, comprising;
at least a joint;
a memory;
a processor; and
one or more computer programs stored in the memory and executable on the processor, wherein the one or more computer programs comprise:
instructions for obtaining coordinates of a plurality of key points of a Motion of the joint of the robot based on a preset linear control model, wherein the plurality of key points are points in a coordinate system at which the joint to switches between two single actions; and the horizontal coordinate of the key points is a time parameter of the motion of the joint, and the vertical coordinate of the key points is a position parameter of the motion of the joint;
instructions for determining coordinates of two smooth connecting points respectively before and after each key point based on a preset time connecting factor;
instructions for calculating a joint motion trajectory between each two adjacent smooth connecting points using a preset parabola connecting formula, based on the coordinates of the two smooth connecting points and the corresponding key point; and
instructions for controlling the joint of the robot to move according to the joint motion trajectory between each two adjacent smooth connecting points.

12. The robot of claim 11, wherein the preset linear control model is:

$$y = y_1 + (y_2 - y_1)\frac{x - x_1}{x_2 - x_1};$$

where, y is the position parameter of the motion of the joint; x is the time parameter of the motion of the joint $x_1$ is the starting time of the single action; $y_1$ is the starting position of the single action; $x_2$ is the ending time of the single action; $y_2$ is the ending position of the single action.

13. The robot of claim 11, wherein the smooth connecting point before each key point is a first smooth connecting point corresponding to the key point, and the smooth connecting point after each key point is a second smooth connecting point corresponding to the key point; the instructions for determining the coordinates of the two smooth connecting points respectively before and after each key point based on the preset time connecting factor comprise:

instructions for subtracting the preset time connecting factor from the time parameter of the motion of the joint of each key point to obtain the time parameter of the motion of the joint of the first smooth connecting point corresponding to the key point, and adding the preset time connecting factor and the time parameter of the motion of the joint of each key point to obtain the time parameter of the motion of the joint of the second smooth connecting point corresponding to the key point; and instructions for importing the time parameter of the motion of the joint of the first smooth connecting point into a preset linear control model to obtain the position parameter of the motion of the joint of the first smooth connecting point corresponding to the key point, and importing the time parameter of the motion of the joint of the second smooth connecting point into the preset linear control model to obtain the position parameter of the motion of the joint of the second smooth connecting point corresponding to the key point.

14. The robot of claim 11, wherein the instructions for calculating the joint motion trajectory between each two adjacent smooth connecting point using the preset parabola connecting formula, based on the coordinates of the two smooth connecting points and the corresponding key point comprise:

instructions for calculating the joint motion trajectory between each two adjacent smooth connecting points based on the preset parabola connecting formula of:

$$y_p = (1-t)^2 y_{p0} + 2(1-t)t y_{p1} + t^2 y_{p2}, \text{ where } t = \frac{x - x_{p0}}{x_{p2} - x_{p0}};$$

where, t the time parameter of the motion of the joint of the joint motion trajectory or two smooth connecting points, $y_p$ is the position parameter of the motion of the joint of the joint motion trajectory of two smooth connecting points $(x_{p0}, y_{p0})$ and $(x_{p2}, y_{p2})$ are the coordinates of two adjacent smooth connecting points, $(x_{p1}, y_{p1})$ is the coordinate of the corresponding key point.

15. The robot of claim 11, wherein the one or more computer programs further comprise:

instructions for obtaining a time interval between any target key point and a key point adjacent to the target key point; and instructions for adjusting the preset time connecting factor such that the adjusted time connecting factor is less than or equal to the time interval, in response to the preset time connecting factor being larger than the time interval.

* * * * *